United States Patent [19]
Story et al.

[11] Patent Number: 5,930,487
[45] Date of Patent: *Jul. 27, 1999

[54] PCI BUS MASTER WITH CASCADED PCI ARBITRATION

[75] Inventors: Franklyn H. Story, Chandler; Omer L. Wehunt, Phoenix, both of Ariz.

[73] Assignee: VLSI Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/611,784

[22] Filed: Mar. 6, 1996

[51] Int. Cl.⁶ .................................................. G06F 13/36
[52] U.S. Cl. ............................ 395/300; 395/299; 395/293
[58] Field of Search .................................... 395/862, 300, 395/293, 309, 287, 306, 299

[56] References Cited

U.S. PATENT DOCUMENTS

| | | | |
|---|---|---|---|
| 4,597,054 | 6/1986 | Lockwood et al. | 395/729 |
| 5,388,228 | 2/1995 | Heath et al. | 395/303 |
| 5,396,602 | 3/1995 | Amini et al. | 395/293 |
| 5,557,756 | 9/1996 | Spencer. | |
| 5,598,542 | 1/1997 | Leung | 395/297 |

*Primary Examiner*—Ayaz R. Sheikh
*Assistant Examiner*—Rupal D. Dharia
*Attorney, Agent, or Firm*—Wagner Murabito&Hao

[57] ABSTRACT

A PCI bus master supporting cascading PCI arbitration. The cascading arbitration allows another PCI initiator on the same bus to share the request and grant signal pair to/from the PCI central arbiter. This allows two PCI devices to appear as a single source to the PCI central arbiter. When a request and grant signal pair are cascaded, they are connected to a subordinate arbiter contained within the cascading bus master. The subordinate arbiter is connected to an internal request and grant signal pair from the cascading bus master, and to an external request and grant signal pair from the cascaded device. The cascading PCI bus master then arbitrates between its internal request and the external cascaded device request and issues the resulting request to the central PCI arbiter. When the grant signal from the central arbiter is returned, the cascading bus master routes it to the appropriate internal or external device. Thereby, bus master support signals can be expanded without having to add a costly bridge.

16 Claims, 5 Drawing Sheets

PCI BUS MASTER WITH CASCADED PCI ARBITRATION

TECHNICAL FIELD

The present invention pertains to the field of computer system bus architecture. More particularly, the present invention relates to a bus architecture having a cascaded PCI arbitration scheme within a PCI bus master device.

BACKGROUND ART

In its simplest terms, a computer system performs arithmetic operations, manipulates data, and makes decisions. Computers are useful because of their ability to execute a series of instructions, called a program, in order to accomplish certain tasks. Virtually all computer systems include a central processing unit (CPU), a memory, an input/output (I/O), and a bus. Basically, the CPU executes the instructions of the computer program that is stored in memory. The I/O provides an interface between the user and the computer system. And the bus allows the different components of the computer system to communicate with each other.

The computer's bus conveys all the information and signals involved in the computer's operation. One or more busses are used to connect the CPU to the memory and to the input/output elements so that data and control signals can readily be transmitted between these different components. Hence, the bus structure is critical in normal computer operations. When a computer executes its programming, it is imperative that data and information flow as fast as possible. Otherwise, a slow bus architecture acts as a bottleneck which slows down the overall performance of the computer system, regardless of the microprocessor's speed or power.

Clearly, it is imperative that large blocks of data be transferred as expeditiously as possible, especially in hardware applications, such as, graphics adapters, full motion video adapters, SCSI host bus adapters, FDDI devices, etc. In addition to the speed requirements of the hardware devices, popular software applications prevalent today demand extremely fast updates of graphic images in order to move, resize, and update multiple windows without imposing unacceptable delays on the end user. Since the screen images are stored in video RAM, this means that the processor must be able to update and move large blocks of data within video memory very fast. This is especially the case when rendering images in real-time (e.g., video teleconferencing, simulations, etc.). These devices are just a few of examples of subsystems which benefit substantially from a very fast bus transfer rate. Hence, selecting an appropriate bus architecture is an important element in determining the computer system's overall performance.

In the past, a variety of bus standards have been implemented (e.g., ISA, EISA, Micro Channel bus, VLB, PCI, etc.). The ISA bus was the original standard of the PC industry. The EISA bus, the Micro Channel bus, and the VESA VL bus are all improvements over the ISA bus. However, the PC industry has presently adopted the PCI bus because of its high rate of data transfers. The PCI bus can be accessed at clock speeds approaching that of the host processor's full native speed. The PCI bus achieves its remarkable speed, in part, by performing read and write transfers over the PCI bus in "burst transfers," whereby multiple blocks of data are conveyed for each transmission. A bus "master" arbitrates over which device coupled onto the PCI bus gets access to the PCI bus. FIG. 1 shows a PCI arbiter 108 arbitrating between seven PCI devices 101–107. This results in an extremely fast and efficient transfer of data from the initiating PCI device to the target PCI device.

However, the PCI bus standard suffers from a major drawback in that there is a limited number of bus masters that may be supported. One cannot simply keep tacking on additional devices to an already saturated PCI bus. In a system that already has the maximum number of bus masters, one prior art solution for circumventing this constraint involves implementing a hierarchical bridge. This hierarchical bridge is used to "bridge" the primary PCI bus to a subordinate PCI bus. FIG. 2 shows a prior art bus architecture having two PCI buses 201 and 202 that are interconnected by a bridge 203. Bus 201 is subordinate to, or beneath, bus 202. Additional PCI devices, such as 204 and 205, can now be coupled to PCI bus 501. The PCI-to-PCI bridge 203 functions as a traffic coordinator between these two PCI buses. Bridge 203 monitors each transaction that is initiated on the two PCI buses. It decides whether or not to pass a transaction between these PCI busses. When the bridge 203 determines that a transaction on one bus needs to be passed to the other bus, the bridge must act as the target of the transaction on the originating bus and as the initiator of the new transaction on the destination bus. Thereby, the bridge 203 allows an additional set of bus masters to be extended via the bridge and subordinate PCI bus.

Although this prior art solution enables more bus masters to be added to the system, there are several disadvantages associated with this approach. The first disadvantage is the additional expense for purchasing the hardware in order to implement the PCI to PCI bridge function. Another disadvantage pertains to the system memory transfer latencies incurred by the bus masters on the subordinate bus. These inherent latencies effectively slows down the speed at which data is transferred.

Yet, if a PCI-to-PCI bridge were not used, then too many electrical loads (e.g., PCI devices) placed onto the PCI bus may cause the PCI bus to malfunction. Furthermore, a particular bus master that requires large amounts of bus time in order to achieve good performance, must now share the bus with other bus masters. Demands for bus time by these other masters may degrade the performance of the bus master subsystem.

Thus, there is need for a more efficient method of adding more PCI bus masters to an already fully loaded PCI bus. It would be highly preferable if such a scheme were inexpensive and does not increase memory transfer latencies. The present invention provides such an elegant solution to these problems.

DISCLOSURE OF THE INVENTION

The present invention pertains to cascaded PCI arbitration scheme within a computer system. The cascaded arbitration scheme of the present invention supports a daisy-chained request/grant pin pair. This allows an additional initiator on the same bus to share a central bus arbiter request/grant pair with the device containing the cascaded or subordinate arbiter. Consequently, two PCI devices appear as a single device to the PCI central arbiter. When a request and grant signal pair are cascaded, they are connected to a subordinate arbiter contained within the cascading bus master. The subordinate arbiter accepts an internal request and grant signal pair from the cascading bus master as well as an external request and grant signal pair from the cascaded, external device. The cascading PCI bus master then arbitrates between its internal request signals and the external cascaded device's request signals. The arbitration is resolved in a fixed priority, non-preemptive manner. Upon completion of the arbitration, the cascading PCI bus master issues a resulting request to the central PCI arbiter. In response to this request, the central arbiter returns a grant signal. The cascading bus master routes the grant signal to the appropriate internal or external bus master. Thereby, additional bus master devices can be added to the PCI bus, without the added expense of having to implement a full PCI-to-PCI bridge function. In addition, the present invention minimizes the system memory transfer latencies added to the bus masters on the subordinate bus. Hence, the present invention provides for an apparatus and method of cascading bus master support via an existing bus master.

BRIEF DESCRIPTION OF THE DRAWINGS

The present invention is illustrated by way of example, and not by way of limitation, in the figures of the accompanying drawings and in which like reference numerals refer to similar elements and in which.

BEST MODE FOR CARRYING OUT THE INVENTION

In the following detailed description of the present invention, numerous specific details are set forth in order to provide a thorough understanding of the present invention. However, it will be obvious to one skilled in the art that the present invention may be practiced without these specific details. In other instances, well known methods, procedures, components, and circuits have not been described in detail as not to unnecessarily obscure aspects of the present invention.

Figure 1:
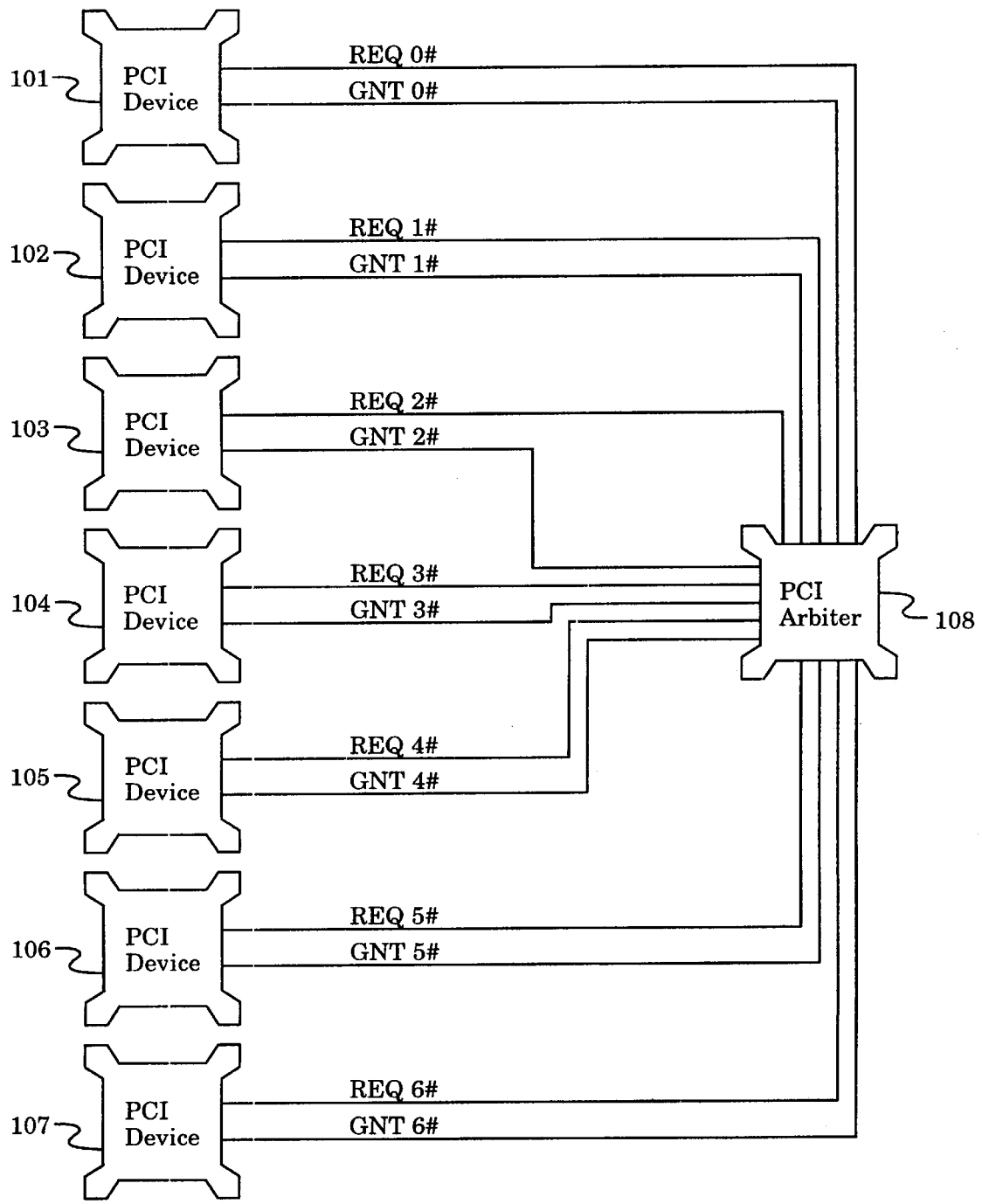
FIG. 1 shows a prior art PCI arbiter arbitrating between seven PCI devices.
Figure 2:
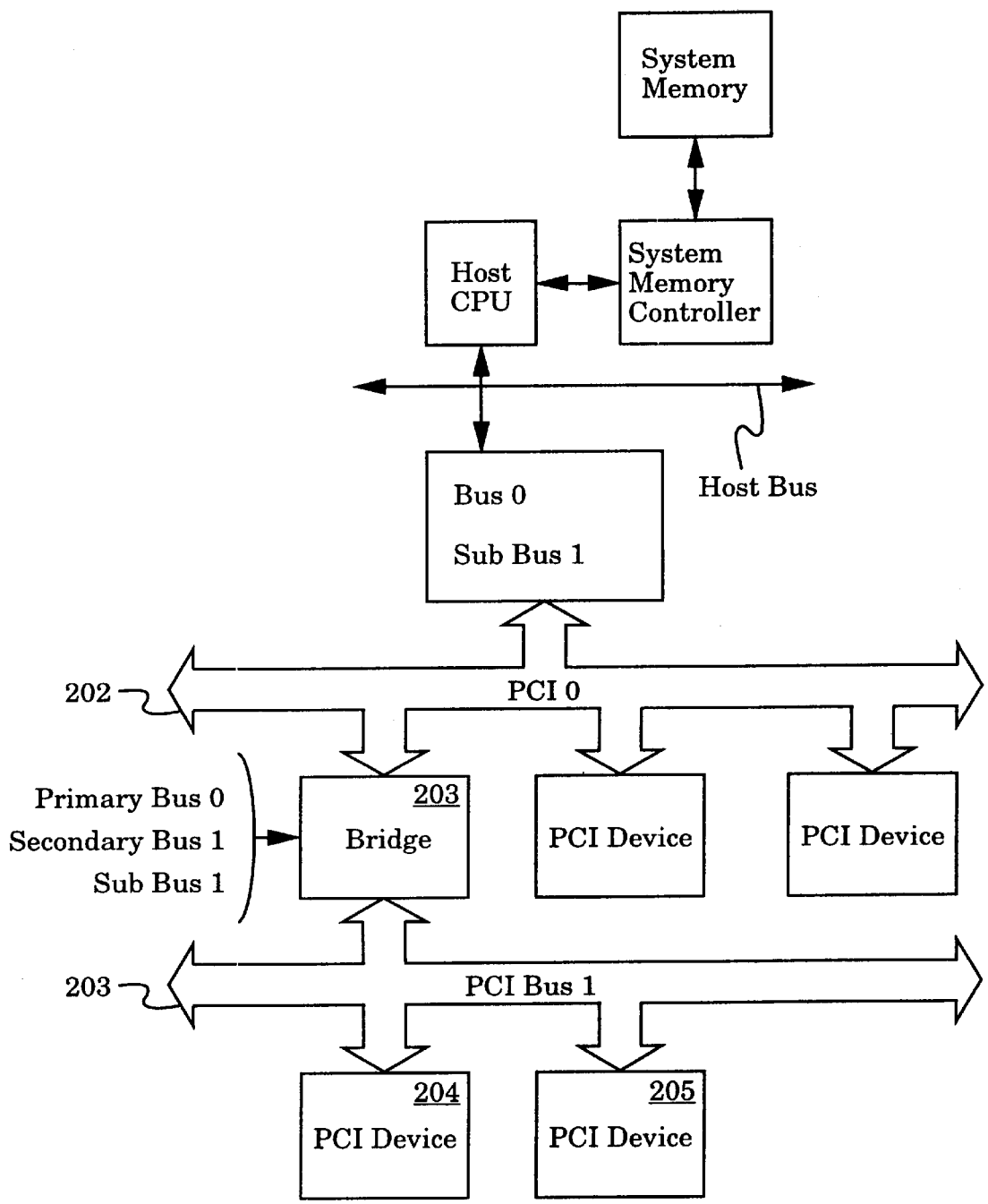
FIG. 2 shows a prior art bus architecture having two PCI buses that are interconnected by a bridge.
Figure 3:
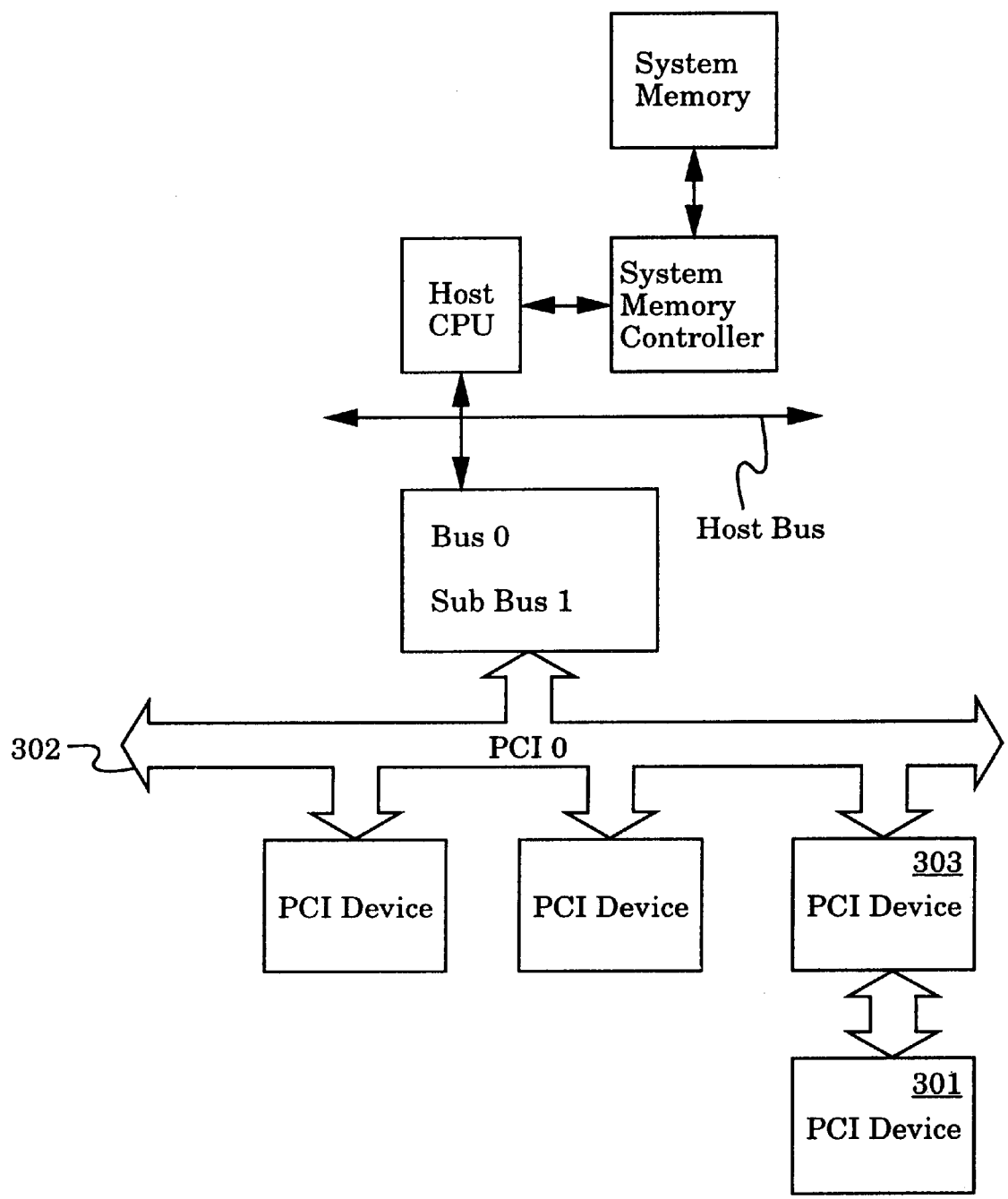
FIG. 3 shows a block diagram of a bus structure upon which the present invention may be practiced.

FIG. 3 shows a block diagram of a bus structure upon which the present invention may be practiced. It can be seen that an additional PCI device 301 can be coupled to the PCI bus 302 via PCI device 303. The additional PCI device 301 follows the standard PCI arbitration procedure. There are two dedicated arbitration signals that are required for each PCI bus master. The request (REQ#) signal is a device specific line, sourced by the bus master. It indicates to the central PCI arbiter that the master desires the exclusive use of the PCI bus. A second arbitration signal, the grant (GNT#) signal, is also a device specific line. The GNT# signal is sourced by the central arbiter and gives the requesting bus master exclusive use of the PCI bus. The master must obey the rules specified in the PCI standards in acquiring, using, and relinquishing control of the bus. Bus acquisition may occur only when the GNT# signal is asserted and the PCI bus is in an Idle state (i.e., both FRAME# and IRDY# deasserted). The bus must be released at the end of a transaction if the GNT# signal has been deasserted.

Figure 4:
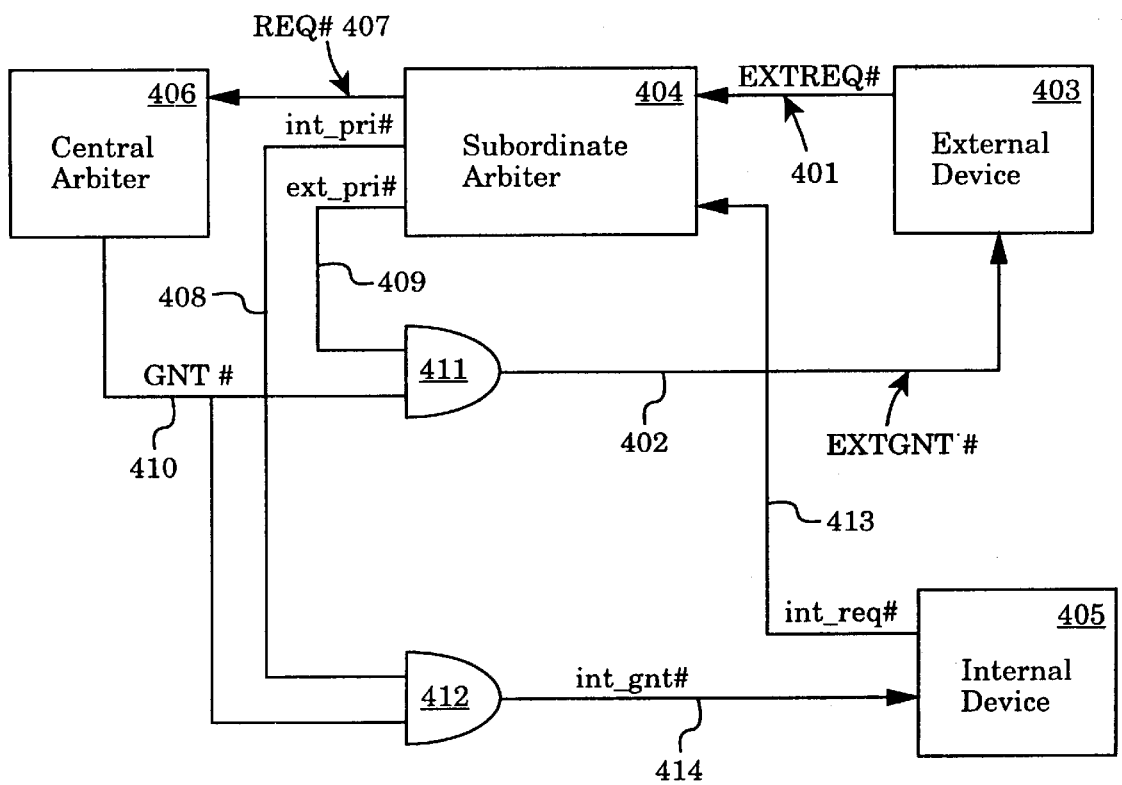
FIG. 4 shows a circuit diagram of a cascaded PCI arbitration scheme according to the preferred embodiment of the present invention.

In the present invention, a cascaded PCI arbitration bus master is supported. FIG. 4 shows a circuit diagram of a cascaded PCI arbitration scheme. It can be seen that the request grant pin pair (i.e., EXTREQ# 401 and EXTGNT# 402) is daisy-chained to allow another PCI initiator 403 on the same bus to share the central bus arbiter request/grant signal pair with the device containing the cascaded, or subordinate, arbiter. The subordinate arbiter 404 is an arbiter which cooperatively selects a request from among competing initiators connected to it (e.g., an internal device 405 and an external device 403), to being coupled to the central PCI arbiter 406. The subordinate arbiter's internal device request is arbitrated with the external device request in a fixed priority, non-preemptive arbitration scheme.

When a request and grant signal pair are cascaded, they are connected to the subordinate arbiter contained within the cascading logic device. The subordinate side of the cascading logic issues a request and grant signal pair from the device in which the logic resides (e.g., int_req# signal 413 and int_gnt# signal 414). Furthermore, an external connection to a request and grant signal pair from the cascaded device (e.g., EXTREQ# signal 401 and EXTGNT# signal 402), are provided. This allows the device with the cascading logic to be inserted in the request and grant signal pair path between the cascaded device and the central arbiter. The cascading logic arbitrates between the internal request (e.g., int_req# signal 413) from the device in which it resides and the external request from the cascaded device. When the subordinate arbiter 404 completes its arbitration, it issues a request REQ# 407 to the central arbiter 406 and initiates priority signals (e.g., int_pri# 408 and ext_pri# 409 signals) to the gating logic. When the grant 410 from the central arbiter 406 is returned, it is routed through the AND gates 411 and 412 to the appropriate subordinate grant signal (e.g., either EXTGNT# signal 402 or int_gnt# signal 414). In the currently preferred embodiment, the subordinate arbiter 404, AND gates 411–412, and internal logic 405 all reside within one of the devices coupled onto the PCI bus, through which the external device's 403 arbitration signals may be cascaded. Furthermore, additional external devices can be daisy-chained onto the PCI bus as described above.

For example, external device 403 can generate a request for the PCI bus by asserting EXTREQ# 401. The subordinate arbiter 404 passes this request onto the central arbiter 406 in the form of a REQ# signal 407. An active (i.e., high) ext_pri# 409 signal is generated, and the int_pri# signal 408 is deasserted (i.e., low). Hence, when the central arbiter 406 generates a GNT# signal 410 to grant access to the PCI bus, AND gate 411 transmits an active EXTGNT# signal 402 because both GNT# 410 and ext_pri# 409 are both active. Note that the int_gnt# signal 414 is not asserted because the int_pri# signal 408 is low which causes AND 412 to output a low signal. Since the EXTGNT# signal 402 is asserted, this indicates that external device 403 now has been given the clearance to own the PCI bus so that it may now commence its transmissions.

Conversely, when the internal logic generates its request in the form of an int_req# signal 413, this request is, likewise, input to the subordinate arbiter 404. In response, the subordinate arbiter 404 generates an active REQ# signal 407 and an active int_pri# signal 408, and deasserts the ext_pri# signal 409. When the central arbiter 406 generates a GNT# signal 410, AND gate 412 outputs an active int_gnt# signal 414 because both the GNT# 410 and int_pri# 408 signals are both active. However, the EXTGNT# signal 402 is not active because of the low ext_pri# signal 409 input to AND gate 411. The active int_gnt# signal 414 indicates that the PCI bus ownership has been granted to the internal logic and that its transmission may now begin. It should be noted that if both the external device 403 were to issue an EXTREQ# signal 401 at the same time as the internal logic 405 were to issue its int_req# signal 413, then subordinate arbiter 404 would be required to arbitrate between these two conflicting requests. The arbitration is awarded in a simple, fixed priority, non-preemptive manner. In the currently preferred embodiment, however, this invention allows the use of any arbitration algorithm in the subordinate arbiter.

Figure 5:
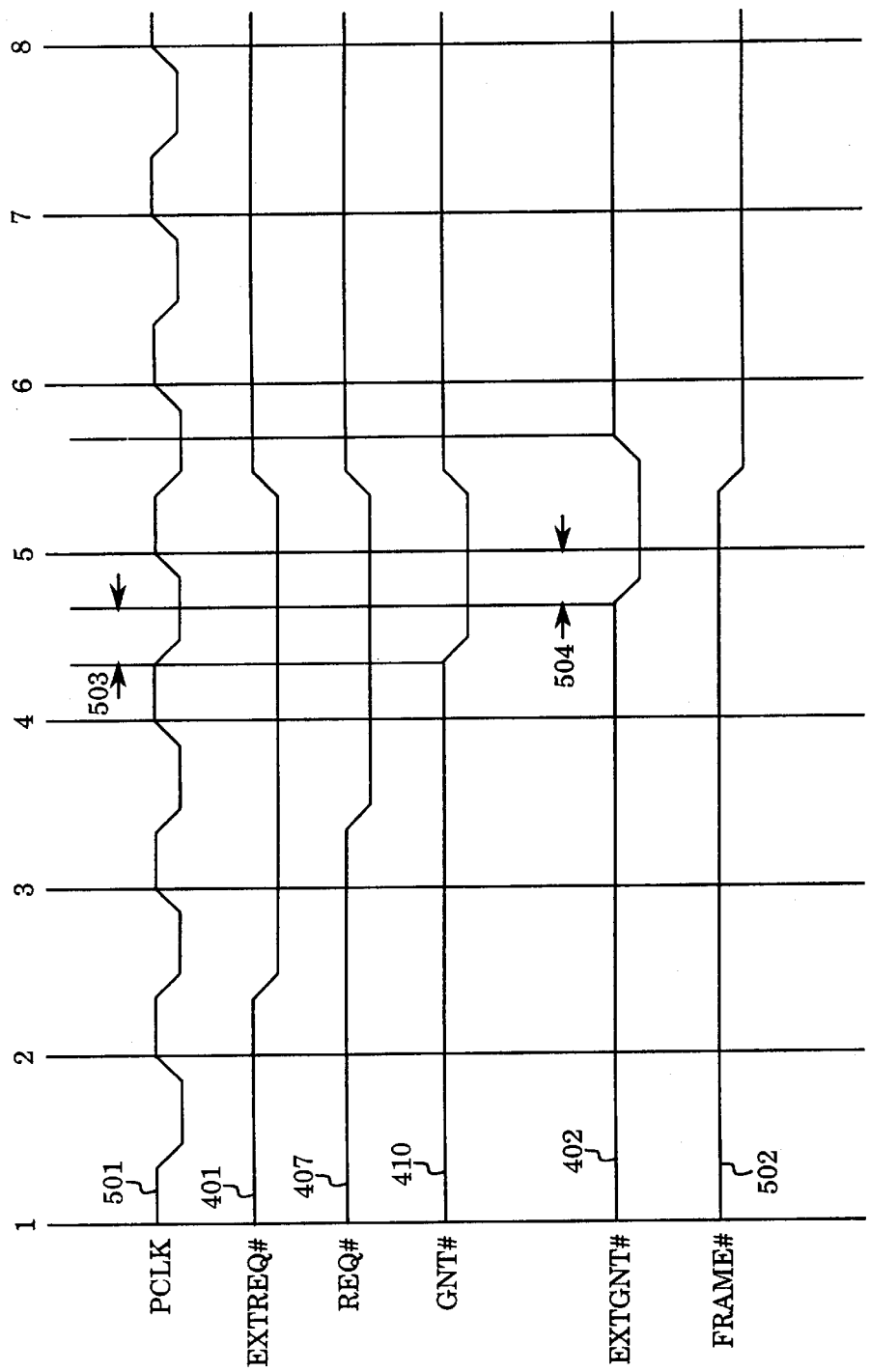
FIG. 5 illustrates the request and grant timing of the present invention.

FIG. 5 illustrates the request and grant timing of the present invention. Since the request signal 407 is an input to the arbiter and has no direct effect on the PCI bus operation, it may be considered non-time critical. Consequently, it may be delayed whole clock cycles with no adverse impact to the PCI bus throughput. This allows two subordinate requests to be arbitrated in a given cycle and the resulting request to the central arbiter be issued in the next cycle. However, the grant signal 410 does control a device that may acquire and own the bus. Since one master's grant may be deasserted while a different master's grant is being asserted, delays in grant signals can cause bus contention due to multiple masters on the PCI bus. For this reason, the grant signal 410 may not be delayed to the next PCI clock cycle. The grant signal must pass through the cascading logic with a sufficiently small delay 503, such that the cascaded (i.e., external) master's grant signal setup time 504 is met.

An example of a write transaction is now described. Initially, the external device sends an external request to the subordinate arbiter. In response, the subordinate arbiter arbitrates between the request from the external device and the internal request and sends a request to the central arbiter if there is no conflict. Accordingly, the central arbiter returns a grant signal. The gating logic routes the grant through quickly enough so that it is available to the external device as an EXTGNT# signal. The external device must then wait for the bus to become idle. This is accomplished by sampling the state of FRAME#, IRDY#, and EXTGNT# signals, through the cascading device, on the rising-edge of each clock. When both FRAME# and IRDY# are sampled as being deasserted, this indicates that the bus is idle. Consequently, a transaction may be initiated by the bus master. The external device now has ownership of the PCI bus through the cascading device. For the remainder of its transaction, the external device carries out its transaction as the current bus master, or initiator.

When ownership is granted, the initiator asserts FRAME# to indicate that the transaction has begun and that a valid start address and command are present on the bus. FRAME# remains asserted until the initiator is ready to complete the last data phase. At the same time that the initiator asserts FRAME#, it drives the start address onto the AD bus and the transaction type onto the Command/Byte Enable bus.

Next, the initiator changes the information that it is presenting to the target over the AD bus. During a write transaction, the initiator is driving the AD bus during both the address and data phases. The initiator uses the Command/Byte Enable lines to indicate the bytes to be transferred and the data paths to be used during the first data phase. The initiator drives the write data onto the AD bus and asserts the respective byte enables to indicate the data paths that carry valid data. It also asserts IRDY# to indicate the presence of the data on the bus. The target device decodes the address and command and asserts DEVSEL# to claim the transaction. In addition, the target device asserts TRDY#, indicating its readiness to accept the first data item. Whereupon, the initiator and the target devices indicate that they are both ready to complete the first data phase by via the active TRDY# and IRDY# signals.

In the first data phase, the target accepts the first data item from the bus. The initiator drives the second data item onto the AD bus and sets the byte enables to indicate the bytes to be transferred and the data paths to be used during the second data phase. It also keeps IRDY# asserted and does not deassert FRAME#, thereby indicating that it is ready to complete the second data phase and that this is not the final data phase. Assertion of IRDY# indicates that the write data is present on the bus. During the following rising-edge clock, the initiator and the currently-addressed target sample both TRDY# and IRDY# being asserted. This indicates that they are both ready to complete the second data phase. The target accepts the second data item from the bus, thus completing the second data phase. If the initiator requires more time before beginning to drive the next data item onto the AD bus, it can insert a wait state into the third data phase by deasserting IRDY#.

When FRAME# is deasserted, this indicates that the final data phase is in progress. The only thing impeding the completion of the final data phase now is the target (i.e., by keeping TRDY# deasserted until it is ready to accept the final data item). An IRDY# active signal indicates that the initiator is still presenting the data. When the target asserts TRDY#, this indicates that it is ready to complete the final data phase. Next, the target and initiator sample both IRDY# and TRDY# asserted, indicating that both the initiator and the target are ready to end the third and final data phase. In response, the third data phase is completed on the next rising-edge of the clock. The target accepts the third data item from the AD bus. Finally, the initiator ceases to drive the data onto the AD bus, stops driving the C/BE bus, and deasserts IRDY#. This returns the bus to the idle state. The target deasserts TRDY# and DEVSEL#.

In transactions where an initiator performs a single data phase write to a target consist of at least two cycles of the PCI clock (e.g., the address phase and a one clock data phase), an idle cycle is to be included between transactions. The second through the last data transfer of a write transaction involving multiple data phases can each be accomplished in a single clock cycle if both the initiator and the currently-addressed target are capable of zero wait state data phases.

The preferred embodiment of the present invention, a PCI bus master supporting cascading PCI arbitration, is thus described. While the present invention has been described in particular embodiments, it should be appreciated that the present invention should not be construed as limited by such embodiments, but rather construed according to the below claims.

What is claimed is:

1. An apparatus for supporting cascaded PCI arbitration for allowing devices on the same bus to share a central arbiter request grant pair, comprising:

a bus for conducting digital data between a first device coupled to the bus and a second device coupled to the bus, wherein the first device generates a first request signal to request access to the bus and the second device generates a second request signal to request access to the bus;

a central arbiter coupled to the bus for arbitrating between the first request signal and the second request signal;

a third device coupled to the second device, wherein the third device generates a third request signal for requesting access to the bus;

a subordinate arbiter coupled to the second device for arbitrating between an internal request signal generated by the second device and the third request signal, wherein the subordinate arbiter generates the second request signal to the central arbiter after arbitrating between the internal request signal and the third request signal;

a routing circuit coupled to the subordinate arbiter for routing a grant signal received from the central arbiter to either the second device or the third device, the grant signal received from the central arbiter routed to the second device or the third device in accordance with which of the second device and the third device was granted priority by the subordinate arbiter;

the routing circuit comprising respective single stage combinational logic gates coupled to the second device and the third device configured to route the grant signal without intermediate storage, wherein the grant signal is coupled as first inputs to each of the gates, the subordinate arbiter generating priority signals which are coupled as second inputs to each of the gates, the priority signals generated in accordance with which of the second device and the third device was granted priority by the subordinate arbiter, the priority signals asserted prior to receiving the grant signal from the central arbiter.

2. The apparatus of claim 1, wherein the subordinate arbiter and the routing circuit are physically integrated into the second device.

3. The apparatus of claim 1, wherein the subordinate arbiter arbitrates between the second request signal and the third request signal.

4. The apparatus of claim 3, wherein the third device is detachably coupled to the second device.

5. The apparatus of claim 3, wherein the routing circuit is comprised of a first AND gate and a second AND gate, wherein the subordinate arbiter generates priority signals which are input to the AND gates such that the first and second AND gates determine whether the grant signal from the central arbiter is routed to the second device or the third device, the priority signals generated in accordance with which of the second device and the third device was granted priority by the subordinate arbiter, the priority signals asserted prior to receiving the grant signal from the central arbiter such that the grant signal is routed to the second or third device with sufficient speed such that the grant signal is not delayed to a following clock cycle.

6. The apparatus of claim 1, wherein the bus is comprised of a PCI bus.

7. In a computer system having a plurality of devices coupled to a bus, a method for cascading a device for arbitration to allow an additional initiator on the same bus to share a central arbiter request grant pair, comprising the steps of:

generating a first request signal from a first device for access to the bus;

generating a second request signal from a second device coupled to the first device, wherein the second request signal is input to a subordinate arbiter;

wherein the subordinate arbiter:

arbitrating between the first request signal and the second request signal;

generating a third request signal according to an arbitration between the first request signal and the second request signal;

transmitting the third request signal to a central arbiter;

receiving a grant signal from the central arbiter;

routing the grant signal from the central arbiter to the first device or the second device via a routing circuit, the grant signal routed according to a priority signal received by the routing circuit, the priority signal generated by the subordinate arbiter, the routing circuit comprising respective single stage combinational logic gates coupled to the second device and the third device configured to route the grant signal without intermediate storage, wherein the grant signal is coupled as first inputs to each of the gates, the subordinate arbiter generating priority signals which are coupled as second inputs to each of the gates, the priority signals generated in accordance with which of the second device and the third device was granted priority by the subordinate arbiter, the priority signals asserted prior to receiving the grant signal from the central arbiter.

8. The method of claim 7, wherein the routing step is comprised of the steps of:

issuing a first priority signal to route the grant signal to the first device;

issuing a second priority signal to route the grant signal to the second device.

9. The method of claim 8 wherein the grant signal is routed with sufficient speed by the routing circuit such that the grant signal is not delayed to a following clock cycle.

10. The method of claim 7, wherein the bus is comprised of a PCI bus.

11. In a computer system, an apparatus for cascading a second set of arbitration signals of a second device coupled to a bus with a first set of arbitration signals of a first device coupled to the bus for allowing the first device and the second device to share a central arbiter request grant pair, comprising:

a subordinate arbiter for determining a priority between the first set of arbitration signals and the second set of arbitration signals, wherein the subordinate arbiter generates a priority signal and a request signal according to which of the first device and second device is given priority;

a central arbiter coupled to the subordinate arbiter for arbitrating between a plurality of devices coupled to the bus, wherein the central arbiter transmits a grant signal in response to the request signal from the subordinate arbiter;

a routing circuit coupled to the subordinate arbiter for routing the grant signal from the central arbiter to one of the first device and the second device according to the priority signal received from the subordinate arbiter;

the routing circuit comprising respective single stage combinational logic gates coupled to the second device and the third device configured to route the grant signal without intermediate storage, wherein the grant signal is coupled as first inputs to each of the gates, the subordinate arbiter generating priority signals which are coupled as second inputs to each of the gates, the priority signals generated in accordance with which of the second device and the third device was granted priority by the subordinate arbiter, the priority signals asserted prior to receiving the grant signal from the central arbiter.

12. The apparatus of claim 11, wherein the routing circuit is comprised of a plurality of AND gates.

13. The apparatus of claim 11, wherein the grant signal is routed to one of the first device and the second device within a pre-determined setup time.

14. The apparatus of claim 11, wherein each of the plurality of devices include a bus master and the bus master of the second device is cascaded with the bus master of the first device.

15. The apparatus of claim 11, wherein the subordinate arbiter and the routing circuit reside within the first device.

16. The apparatus of claim 11 further comprising a third device coupled to the second device, wherein the subordinate arbiter arbitrates request signals generated by the first device, the second device, and the third device.

* * * * *